United States Patent
Vanderwerf et al.

[19]

[11] Patent Number: 6,024,452
[45] Date of Patent: Feb. 15, 2000

[54] PRISMATIC LIGHT BEAM HOMOGENIZER FOR PROJECTION DISPLAYS

[75] Inventors: Dennis F. Vanderwerf; Alan J. Herbert, both of Austin, Tex.

[73] Assignee: 3M Innovative Properties Company, St. Paul, Minn.

[21] Appl. No.: 08/841,436

[22] Filed: Apr. 22, 1997

[51] Int. Cl.[7] .............................. G03B 21/14; G02B 5/04
[52] U.S. Cl. ................................ 353/38; 353/81; 359/834
[58] Field of Search .................................... 353/38, 81, 102; 359/834; 362/308, 304, 305, 333, 337, 268

[56] References Cited

U.S. PATENT DOCUMENTS

| | | | |
|---|---|---|---|
| 1,189,266 | 7/1916 | Landry | 353/38 |
| 1,912,377 | 6/1933 | Kosken | 353/88 |
| 2,183,249 | 12/1939 | Schering et al. | |
| 2,186,123 | 1/1940 | Rantsch et al. | |
| 2,326,970 | 8/1943 | Rantsch et al. | |
| 4,637,691 | 1/1987 | Ushara et al. | |
| 4,769,750 | 9/1988 | Matsumoto et al. | 353/38 |
| 5,146,248 | 9/1992 | Duwaer et al. | |
| 5,208,620 | 5/1993 | Mitsutake et al. | 353/38 |
| 5,414,559 | 5/1995 | Burghardt et al. | 359/623 |
| 5,418,583 | 5/1995 | Masumoto | 362/268 |
| 5,459,592 | 10/1995 | Shibatani et al. | |
| 5,548,444 | 8/1996 | McLaughlin et al. | 359/629 |
| 5,610,733 | 3/1997 | Feldman et al. | 359/9 |
| 5,805,337 | 9/1998 | Yoshida | 353/81 |

FOREIGN PATENT DOCUMENTS

| | | |
|---|---|---|
| 0 512 893 A1 | 4/1992 | European Pat. Off. . |
| 0 545 052 A2 | 10/1992 | European Pat. Off. . |
| 0 646 828 A1 | 3/1994 | European Pat. Off. . |
| 0 676 902 A2 | 3/1995 | European Pat. Off. . |
| 0 807 832 A2 | 11/1997 | European Pat. Off. .......... G02B 5/04 |
| 3-80221 | 7/1991 | Japan . |
| 301800 | 11/1995 | Japan . |
| 321003 | 12/1995 | Japan . |
| 8-201759 | 8/1996 | Japan . |
| WO 91/18315 | 11/1991 | WIPO . |

OTHER PUBLICATIONS

Marshall, Gerald F., "Tapered Light Guide Condenser: A Design Approach" SPIE vol. 176, Guided Wave Optical Systems & Devices II (1979).

*Primary Examiner*—William Dowling
*Attorney, Agent, or Firm*—Nestor F. Ho

[57] ABSTRACT

A device for homogenizing light rays from a light source. The device includes a first multi-prismatic surface, a second multi-prismatic surface, and a reflective housing connecting the first multi-prismatic surface with the second multi-prismatic surface. The device may be employed in a liquid crystal display projection system. The system includes, in addition to the device, a parabolic reflective collimator, a lamp centered in the parabolic reflective collimator, the lamp emitting light rays reflected by the parabolic reflective collimator, and a liquid crystal display positioned to receive light rays passing through the first multi-prismatic surface, the reflective housing, and the second multi-prismatic surface.

20 Claims, 10 Drawing Sheets

PRISMATIC LIGHT BEAM HOMOGENIZER FOR PROJECTION DISPLAYS

BACKGROUND OF THE INVENTION

The invention relates generally to projection displays, and more particularly, relates to a compact prismatic light beam homogenizer for projection displays of the electronic valve type.

High intensity light sources that produce uniform and collimated light are increasingly important for projection display systems. One of the most common and efficient methods of collecting light from a high intensity arc source, such as a metal-halide lamp, employs a parabolic or elliptic reflector, with axial mounting of the lamp. For reflective collectors such as this and others, brightness non-uniformities at the light valve and projected image occur because of three primary factors. One factor is reduction of projected brightness in peripheral regions of the reflector. Another factor is the shadowing effect of the lamp electrode, envelope, and electrical lead near a central region of the reflector. A third factor is a vertex hole in the reflector, through which the lamp is conventionally mounted.

Several techniques have been employed to increase light uniformity from light sources and reflecting collectors, particularly for projection display applications. One technique uses a separated pair of multi-lens arrays, positioned between a light source and a light valve. This technique was initially described in U.S. Pat. No. 2,183,249, of Schering, and U.S. Pat. Nos. 2,186,123 and 2,326,970, of Rantsch. More recently, variations of the technique have been described, for example, in European Patent Application 512893, of Lehureau, U.S. Pat. No. 4,769,750, of Matsumoto, European Patent Application 646828, of Nakayama, and U.S. Pat. No. 5,418,583, of Masumoto.

Another technique uses a non-imaging light pipe or light guide to form a homogenized light beam at an exit aperture. This technique was described by Marshall in "Tapered light guide condenser: a design approach", *SPIE Proceedings*, Vol. 176, 1979, pp. 161–167. The non-imaging reflectors of the technique are further described in U.S. Pat. No. 5,146,258, of Duwaer, Japanese Patent 380221, of Casio, U.S. Pat. No. 5,459,592, of Shibatani, Japanese Patent 7301800, of Fujitsu, and European Patent Application 676902, of Dolgoff.

Another related approach uses multiple scattering within a cavity completely enclosing a light source. The light emerges from an exit aperture. The approach was described in WO Publication 91/18315.

Yet another approach to providing a more uniform light beam from a reflecting parabolic collector includes placing an aspheric correcting lens with a strong central gradient between a light source and a light valve. The approach was described in European Patent Application 545052, of Mitsutake. Other types of compensating lenses or beam deflecting prisms have been described in U.S. Pat. No. 5,459,592, of Shibatani, Japanese Patent 7321003, of Ricoh, and Japanese Patent 8201759, of NEC.

Notwithstanding the foregoing techniques, various disadvantages are presented by the conventional technology. For instance, refractive beam homogenizing devices can introduce additional chromatic dispersion into the projection optics. Reflective light pipe beam homogenizers or light integrators, as well, are not very efficient in transmission, and are usually not very compact. Likewise, beam deflecting prisms, positioned between a light source and light valve, can radically change the incident angles of light at the light valve, thus, causing problems in focusing the light into the projection lens.

Therefore, what is needed is a prismatic light beam homogenizer for application in projection displays, for example, with a light valve or LCD light source, which homogenizer has a design that overcomes many of these disadvantages.

SUMMARY OF THE INVENTION

To this end, embodiments of the present invention, accordingly, address these disadvantages by providing a compact, non-dispersive, high transmission beam homogenizer, which preserves the collimation angles from the light source. An embodiment of the invention is a device for homogenizing light rays from a light source. The device comprises a first multi-prismatic surface, a second multi-prismatic surface, and a reflective housing connecting the first multi-prismatic surface with the second multi-prismatic surface.

Another embodiment of the invention is a device for homogenizing light rays from a light source. The device comprises an input multi-prismatic surface, a common multi-prismatic surface, an output multi-prismatic surface, and a reflective housing connecting the input multi-prismatic surface, the common multi-prismatic surface, and the output multi-prismatic surface.

Yet another embodiment of the invention is a device for homogenizing light rays from a light source. The device comprises a solid cylinder having a first planar end and a second planar end, the first planar end having concentric prismatic refractive grooves and the second planar end having concentric prismatic refractive grooves.

Another embodiment of the invention is a liquid crystal display projection system. The system includes a parabolic reflective collimator, a lamp centered in the parabolic reflective collimator, the lamp emitting light rays reflected by the parabolic reflective collimator, a first multi-prismatic surface disposed in the light rays reflected by the parabolic reflective collimator, a second multi-prismatic surface, a reflective housing connecting the first multi-prismatic surface with the second multi-prismatic surface, and a liquid crystal display positioned to receive light rays passing through the first multi-prismatic surface, the reflective housing, and the second multi-prismatic surface.

DESCRIPTION OF THE INVENTION

Figure 1:
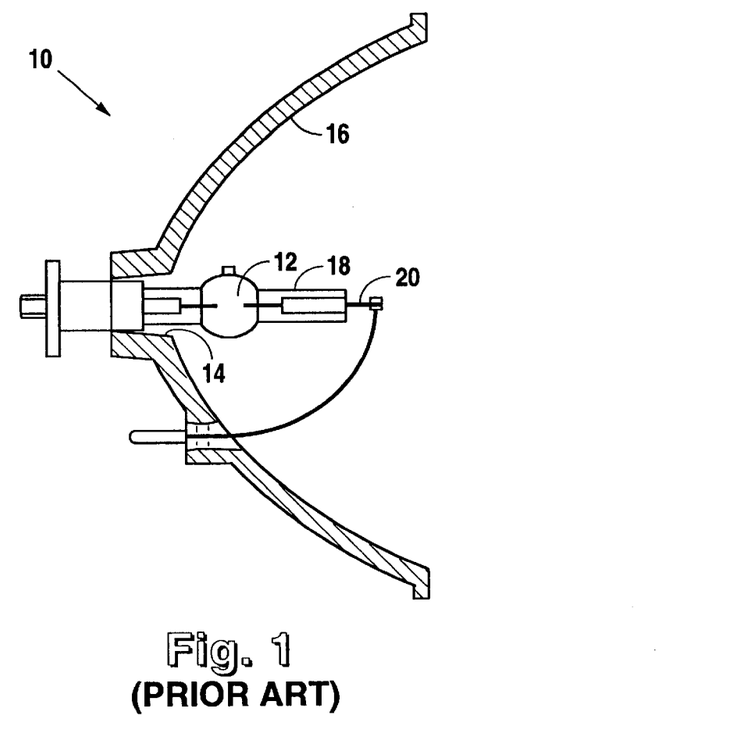
FIG. 1 is a cross-sectional view of a conventional lamp and parabolic reflect or mounting.

Referring to FIG. 1, a conventional lamp and parabolic reflector unit 10 includes an arc discharge lamp 12, such as a metal-halide type lamp, mounted in a central vertex hole 14 of a parabolic reflective collimator 16. This unit 10 is an efficient light collection system, and is typical of the systems which have been previously used in electronic projection displays, such as a liquid crystal display (LCD) projector. With the unit 10, a dark spot results in the center of the collimated, reflected beam because of the central obscuration caused by a lamp envelope 18 and a front electrode with electronic lead 20 of the lamp 12. The central vertex hole 14 of the parabolic reflective collimator 16, through which the lamp 12 is mounted, also contributes to a central dark spot of the reflected beam. In addition, the reflected light intensity usually decreases toward the periphery of the parabolic reflective collimator 16. These effects contribute to a highly non-uniform reflected beam.

Figure 2:
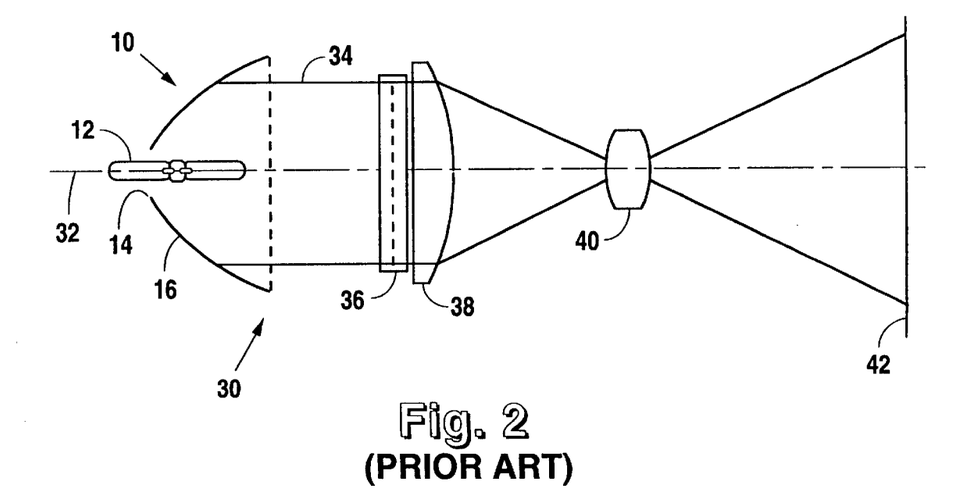
FIG. 2 is a simplified, side view illustration of a conventional light valve projection system.

Referring to FIG. 2, a conventional projection system 20 includes the conventional lamp and parabolic reflector unit 10 of FIG. 1. The conventional projection system 20 is centered on an optic axis 32. Light from the arc discharge lamp 12, which is axially mounted in the central vertex hole 14 of the parabolic reflective collimator 16, is collimated by the parabolic reflective collimator 16. Collimated light, identified as 34, passes through a modulating transmissive light valve 36, such as a liquid crystal display, and is converged by a field lens 38 to a projection lens 40. The projection lens 40 forms a magnified image of the LCD on a projection screen 42.

Figure 3:
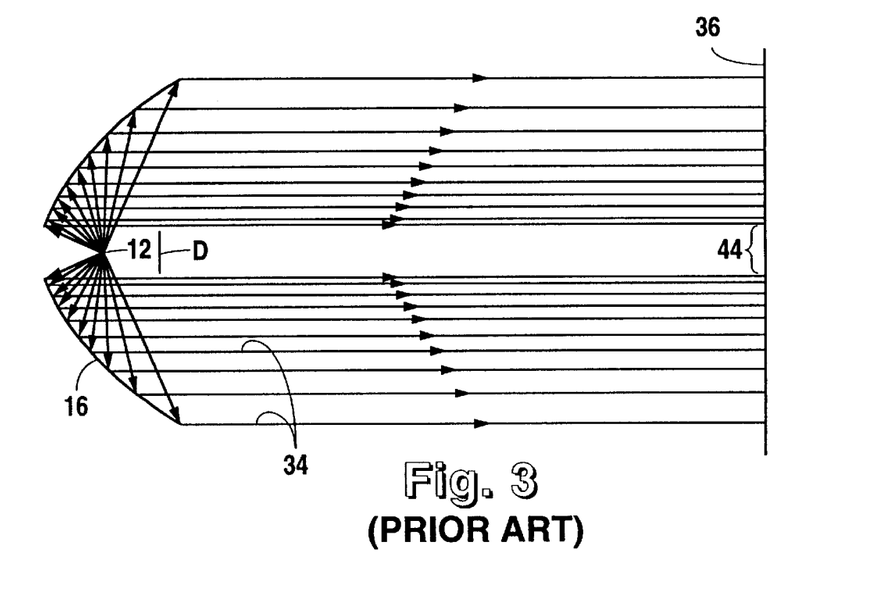
FIG. 3 representative light rays reflected from a parabolic collector with a central lamp mounting hole.

Referring to FIGS. 2 and 3, in conjunction, light rays 34 from the parabolic reflective collimator 16 are shown in simplified form as they illuminate the light valve 36. It can be understood from FIG. 3 how the central vertex hole 14 and the lamp 12 result in a dark spot 44 of diameter D at the light valve 36.

Figure 4:
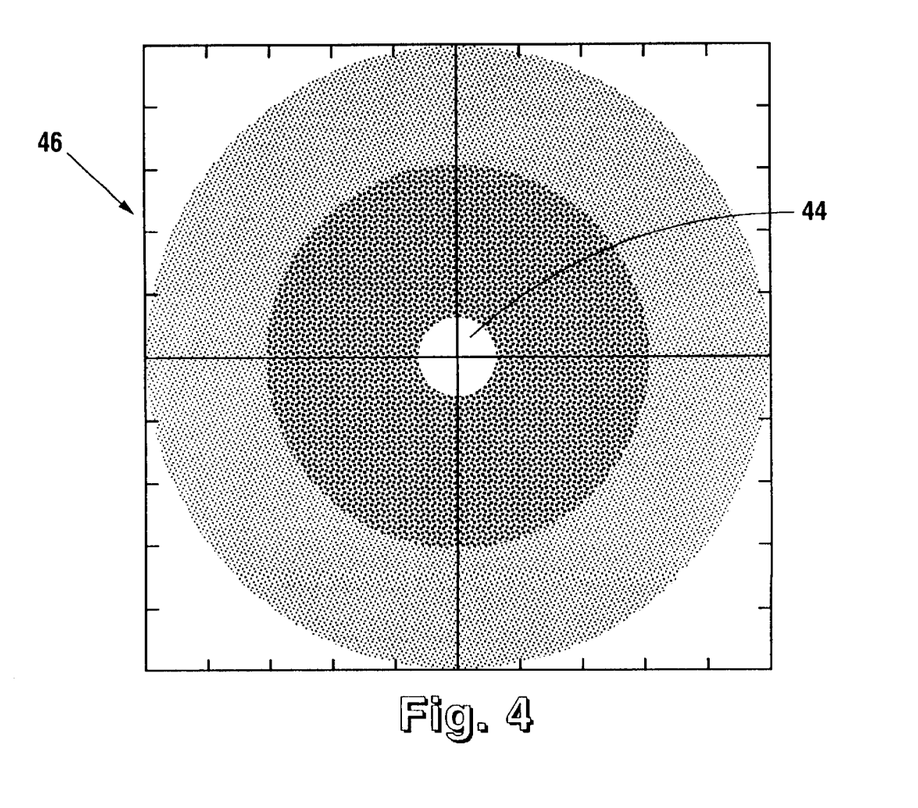
FIG. 4 shows the resultant light distribution at the light valve, using a parabolic collector with a central lamp mounting hole.

Referring to FIG. 4, a typical light intensity distribution or illumination pattern 46 at the light valve 36 shows the dark spot 44 at the center of the pattern 46. At the edges of the dark spot 44, the light intensity is greatest and the intensity lessens towards the periphery of the pattern 46. The pattern 46 results because of the central vertex hole 14 and lamp 12 centered in the parabolic reflective collimator 34 and the particular reflective characteristics of the parabolic reflective collimator 34 with the light source centered therein.

Figure 5:
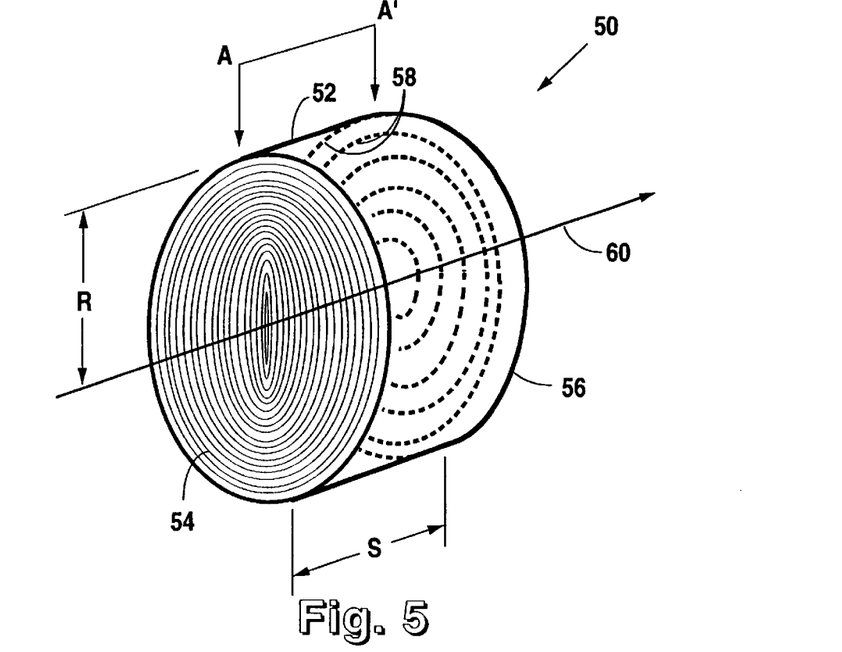
FIG. 5 is a perspective view of a prismatic light beam homogenizer cell, according to embodiments of the present invention.

Referring to FIG. 5, a prismatic light beam homogenizer cell 50 includes a tube 52. The tube 52 is rigid, hollow, and cylindrical and has two planar circular ends. The first end is fixed with an input prismatic element 54. The second end is fixed with an identical, but opposing, output prismatic element 56. The input prismatic element 54 and the output prismatic element 56 each include multiple, adjacent, concentric circular microprismatic grooves on one planar surface of the element 54 and 56, respectively. The other planar surface of each of the elements 54 and 56 is generally flat and smooth, without significant flaws or deviations. The tube 52 has radius R and length S. Each of the elements 54 and 56 also has radius R. An inner surface 58 of the tube 52 is light reflective.

Figure 6:
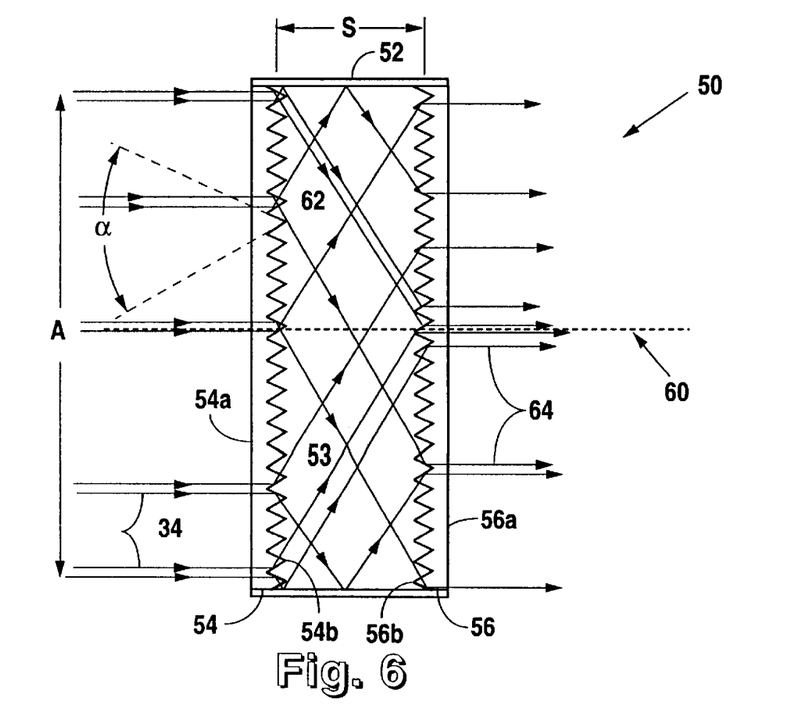
FIG. 6 is a cross-section of the prismatic light beam homogenizer cell of FIG. 5, taken along a diameter of the homogenizer cell indicated by line A-A', acceding to embodiments of the present invention.

Referring to FIG. 6, the input prismatic element 54 has a smooth side 54$a$ and a microprismatic grooved side 54$b$. The microprismatic grooved side 54$b$ is formed with multiple, concentric microprismatic grooves 62. The microprismatic grooves 62 each have an apex angle $\alpha=60°$. Similarly, the output prismatic element 56 includes a smooth side 56$a$ and a microprismatic grooved side 56$b$. The microprismatic grooved side 56$b$ is also formed with the concentric microprismatic grooves 62. In general, S=R tan $\delta$, where R is the radius of each of the input and output prismatic elements 54 and 56, respectively, and of the tube 52 and $\delta$ is a deviation angle of light rays as the rays pass from the input prismatic element 54 and through the output prismatic element 56. For example, for $\alpha=60°$, $\delta=60°$, R=25 millimeters and S=14.4 millimeters.

In operation, the prismatic light beam homogenizer cell 50 is centered on an optic axis 60. The optic axis 60 indicates the direction of light, first contacting the input prismatic element 54, then passing through the tube 52, and finally exiting through the output prismatic element 56. Incident collimated light in the direction of optic axis 60, having non-uniform radial intensity, such as, for example, collimated light from the conventional lamp and parabolic reflector unit 10 of the conventional projection system 30 of FIG. 2, enters the prismatic light beam homogenizer cell 50 through the input prismatic element 54 and exits with a more evenly distributed radial intensity through the output prismatic element 56.

Figure 7:
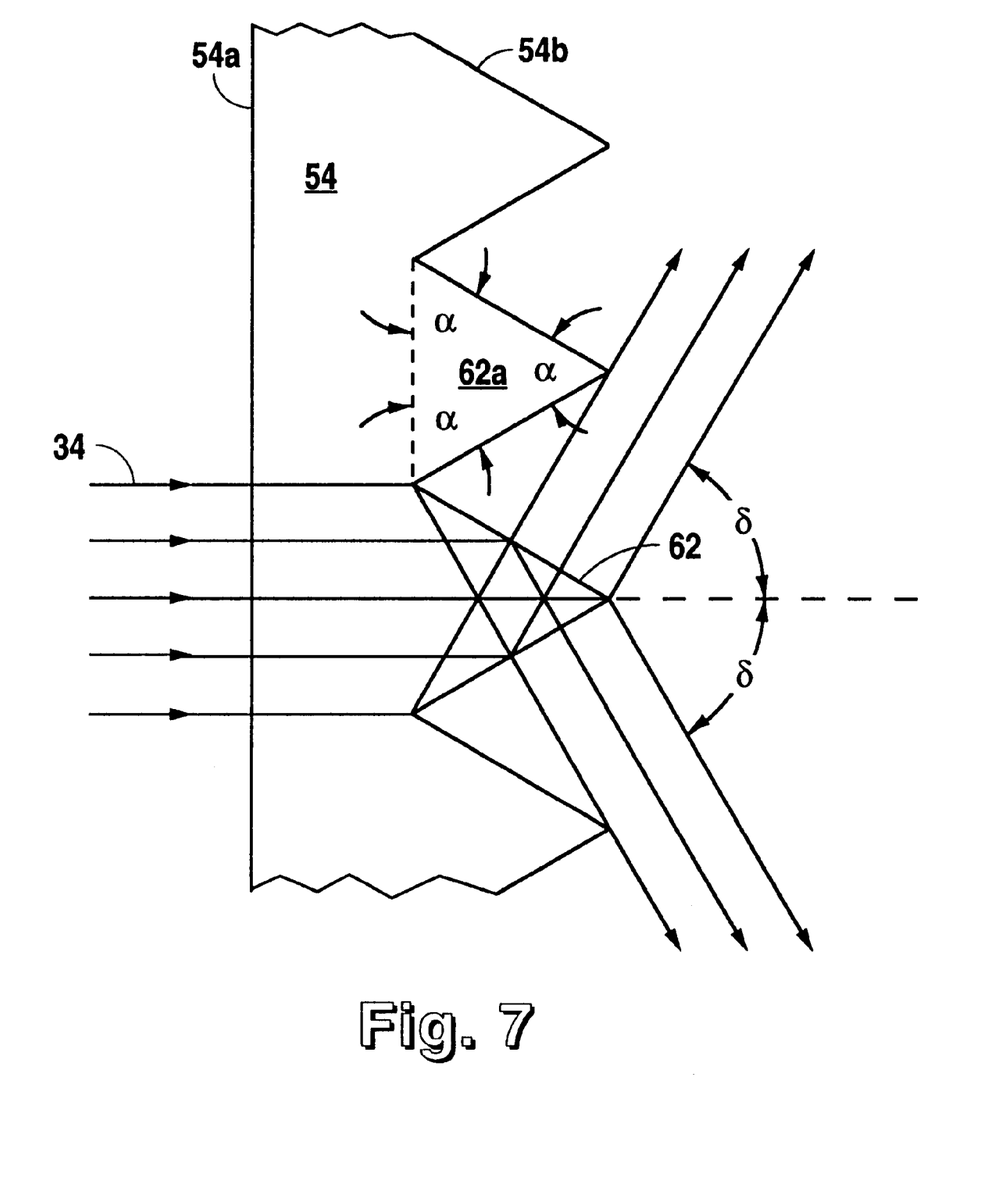
FIG. 7 is an enlarged cross-section of a prismatic element of the prismatic light beam homogenizer cell of FIG. 5, showing in detail several of the circular microprismatic grooves on a surface of the element and the other flat surface of the element, according to embodiments of the present invention.

Referring to FIGS. 6 and 7, in conjunction, the concentric microprismatic grooves 62 of the input prismatic element 54 and of the output prismatic element 56 each form equilateral triangular prisms 62$a$, as shown in enlarged detail in FIG. 7. The microprismatic grooved surfaces 54$b$ and 56$b$ of the input prismatic element 54 and the output prismatic element 56, respectively, face each other inwardly within the tube 52 and are separated by the distance S of the length of the tube 52. Light rays 34 of collimated light having non-uniform radial intensity enter the cell 50. Each light ray 34 is deviated at the deviation angle $\delta=60°$ either generally upward or generally downward, as viewed in FIGS. 6 and 7, by total internal reflection (TIR) within the input prismatic element 54. Some light rays 34 pass directly to the output prismatic element 56, while other light rays 34 are reflected by the reflective inner surface 58 of the tube 52 before passing to the output prismatic element 56.

Each light ray 64 exiting the output prismatic element 56 retains its original entrance direction, which is parallel to the optic axis 60. The separation S of the prismatic elements 54 and 56 is chosen such that all light rays 34 entering near a center of the input prismatic element 54 are directed to an edge of the output prismatic element 56, and all light rays 34 entering near an edge of the input prismatic element 54 are directed toward a center of the output prismatic element 56. The irradiance distribution of the collimated light entering the input prismatic element 54 is, therefore, radially inverted when it exits from the output prismatic element 56.

No chromatic dispersion is introduced in the prismatic light beam homogenizer cell 50 since all light ray deviations for perfectly collimated light occur either by total internal reflection in the prismatic elements 54 and 56, or by first surface specular reflection from the reflective inner surface 58 of the tube 52. The light ray deviations are, therefore, independent of the refractive index of the prismatic elements 54 and 56. Even for slight deviations from perfect collimation of the input light, there is no chromatic dispersion for rays which are refracted at either surface of the prismatic elements 54 and 56 and internally reflected at the grooved surfaces 54b and 56b, respectively, because the 60° equilateral TIR microprisms which form the microprismatic grooves 62 of the grooved surfaces 54b and 56b, respectively, function as non-dispersive prisms.

Figure 8:
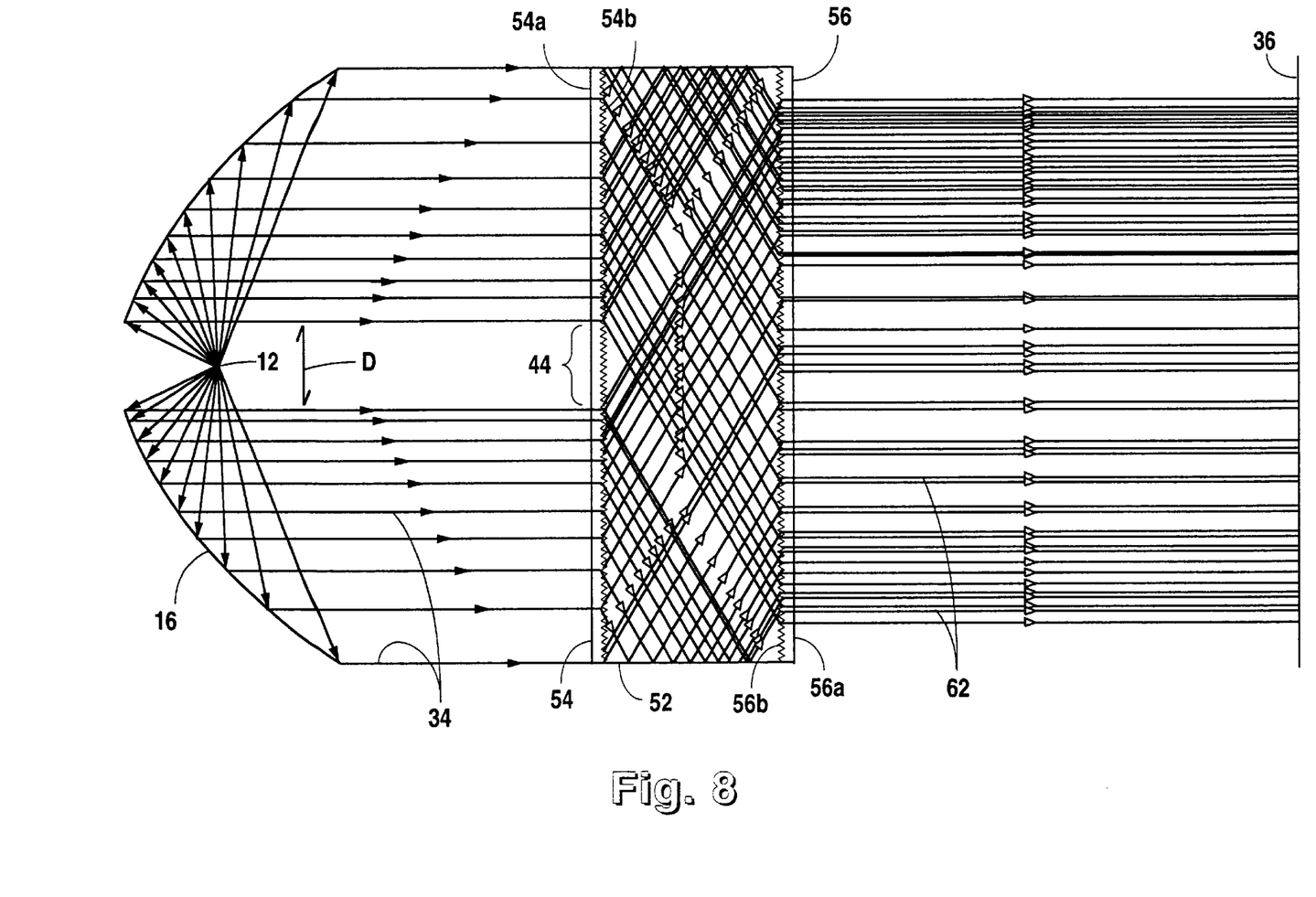
FIG. 8 shows representative light rays reflected from a parabolic collector with a central lamp mounting hole, using a single cell prismatic light beam homogenizer, according to embodiments of the present invention.
Figure 9:
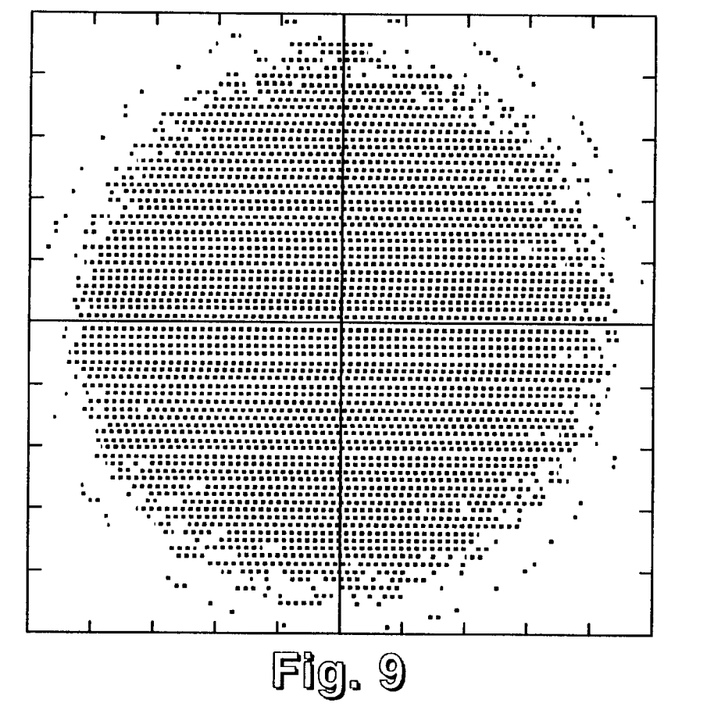
FIG. 9 shows the resultant light distribution at the light valve, using a parabolic collector with a central lamp mounting hole, with a single cell prismatic light beam homogenizer, according to embodiments of the present invention.

Referring to FIGS. 7 and 8, in conjunction, the prismatic light beam homogenizer cell 50 more uniformly disperses light rays 34 that illuminate the light valve 36. FIG. 8 shows the resultant light intensity distribution pattern 64 at the plane of the light valve 36. Note that, in comparison to FIG. 4, there is no dark spot 44 in the center of the pattern 64 and the light intensity is substantially uniform throughout the pattern 64. The pattern 64 results because the prismatic light beam homogenizer cell 50 radially inverts the irradiance distribution of the collimated light entering the input prismatic element 54 as it exits from the output prismatic element 56.

An example of an LCD projection system using the prismatic light beam homogenizer cell 50 follows:

A prototype LCD projection system can be constructed using the following specific components. A 250 watt metal-halide arc-discharge lamp (Ushio UMI-250-DC) is axially mounted in an electroformed parabolic reflector (Opti-Forms POF5-4-AF) having a focal length=5.1 millimeters and an output aperture=72 millimeters. A 75 mm by 75 mm piece of low-expansion borosilicate glass, with a heat-reflecting dichroic coating, is inserted between the output aperture of the parabolic reflector and the beam homogenizer cell. The beam homogenizer cell is a single cell beam homogenizer with acrylic plastic microprismatic elements, each having a diameter of 49 millimeters and a thickness of 2 millimeters. The length of each face of the equilateral triangular microprisms of the elements is 0.25 millimeters. A silver-coated glass reflecting cylinder of the beam homogenizer cell has a diameter of 49 millimeters and a length of 14 millimeters. A VGA compatible 1.3 inch diagonal LCD module (Seiko Epson #P13VM115/125) is illuminated by the collimated light exiting the beam homogenizer cell. A plano-convex field lens focuses the collimated light exiting the LCD module into a 75 millimeter focal length, f/2.5 coated anastigmat projection lens (JML Optical Industries).

Figure 10:
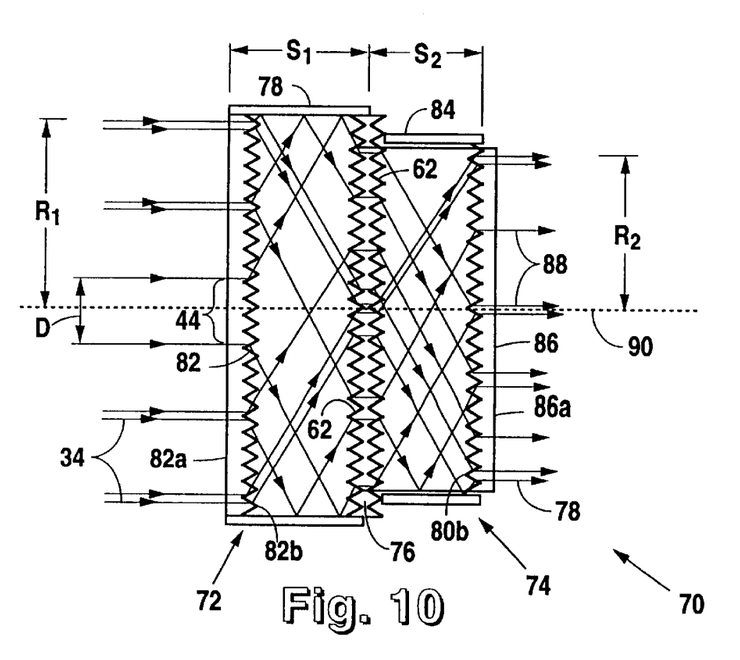
FIG. 10 is a cross-section of a dual cell prismatic light beam homogenizer, according to embodiments of the present invention.

Referring to FIG. 10, a dual cell beam homogenizer 70 includes a first cell 72 and a second cell 74, each substantially of the type of the prismatic light beam homogenizer cell 50 of FIGS. 5 and 6. The dual cell beam homogenizer 70, however, may include a common prismatic element 76 shared between the first cell 72 and the second cell 74. The common prismatic element 76 includes microprismatic grooves 62 on each side of the element 76. The first cell 58 includes a tube 78 having two ends. One end of the tube 78 is fixed with an input prismatic element 82 having a smooth side 82a and a microprismatic grooved side 82b. The other end of the tube 78 is fixed with the common prismatic element 76. The tube 78 has radius $R_1$ and length $S_1$. The second cell 74 also includes a tube 84 having two ends. One end of the tube 84 is fixed with the common prismatic element 76, and the other end is fixed with an output prismatic element 86. The output prismatic element 86 has a smooth side 86a and a microprismatic grooved side 86b. The tube 78 has radius $R_2$ and length $S_2$.

Figure 11:
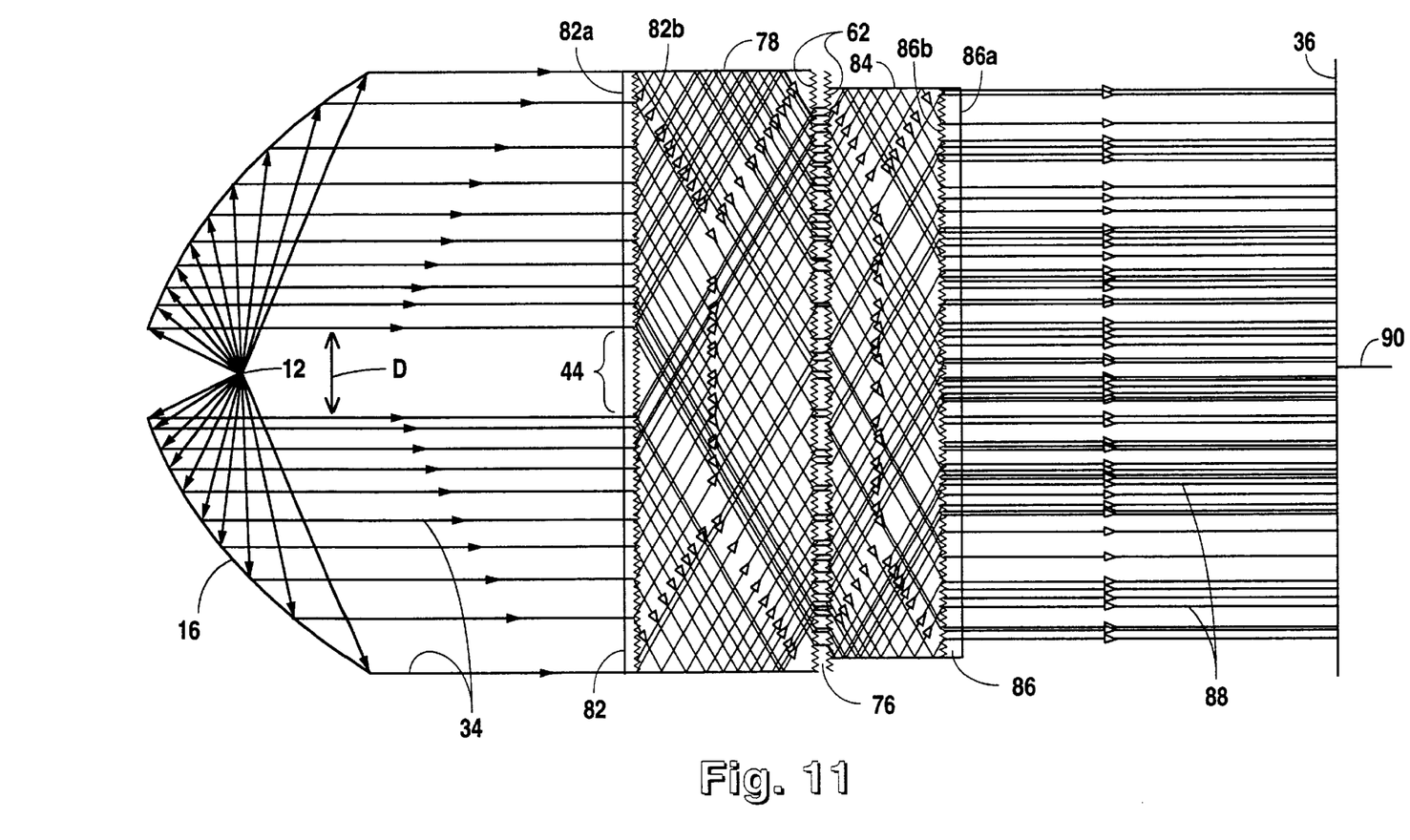
FIG. 11 shows representative light rays reflected from a parabolic collector with a central lamp mounting hole, using a dual cell prismatic light beam homogenizer, according to embodiments of the present invention.

Referring to FIGS. 10 and 11, in conjunction, in operation, the dual cell beam homogenizer 70 eliminates the effect of any central obscuration or parabolic reflector vertex hole in the light source delivering the light rays 34. The dual cell beam homogenizer 70 is centered on an optic axis 90. The separation $S_2$ of the common prismatic element 76 and the output prismatic element 86 of the second cell 74 and the reflecting cylinder radius $R_2$ of the tube 84 are adjusted such that collimated light rays 34 near the periphery of the parabolic reflector's central vertex hole 14 (shown in FIGS. 1 and 2) of diameter D exit the second cell 74 as light rays 88 close to the optic axis 90. Thus the result of a central obscuration of diameter D, or missing light from the parabolic vertex hole, i.e., the dark spot 44, is eliminated. Also, collimated light rays 34 entering near the periphery of the first cell 72 exit as parallel rays 88 near the periphery of the second cell 74. The resultant exit beam of light rays 88 has a smaller radius $R_2$ than the radius $R_1$ of the entrance beam light rays 34, where $R_2 \approx R_1 - D$, $S_1 = R_1 \tan 60°$, and $S_2 = R_2 \tan 60°$.

Figure 12:
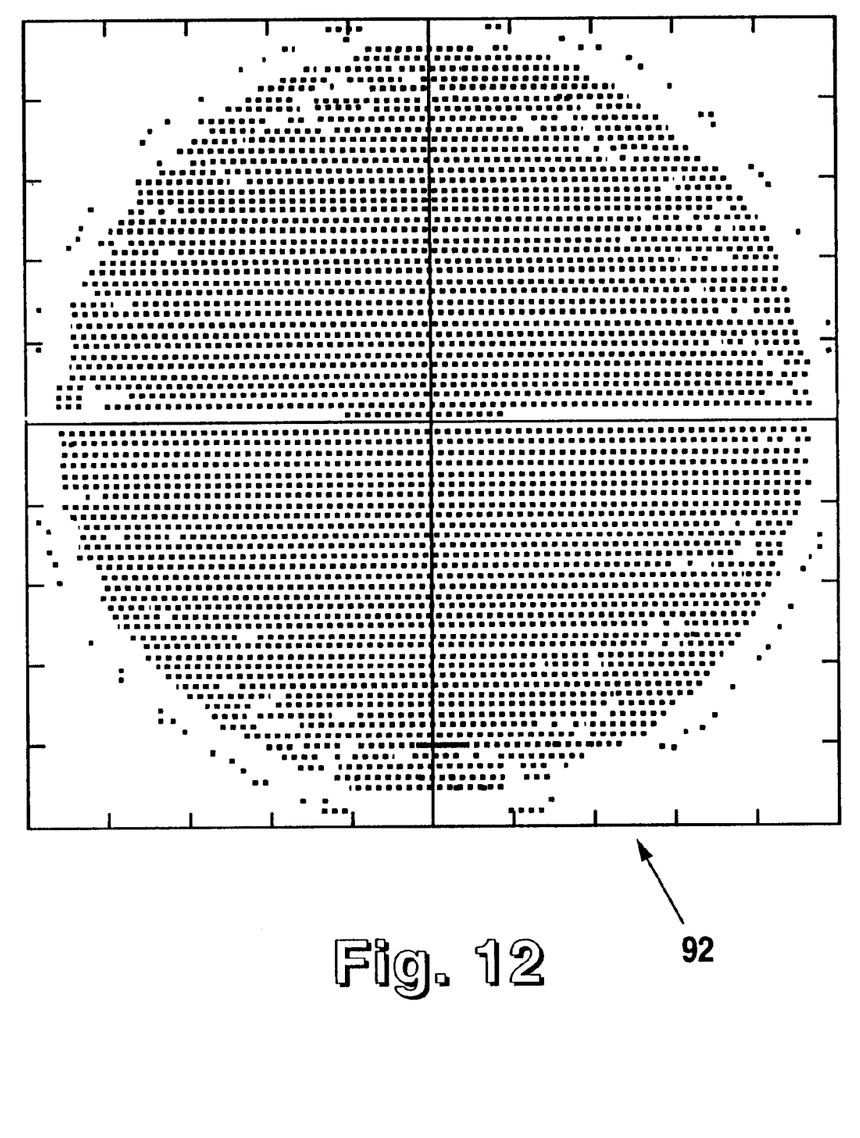
FIG. 12 shows the resultant light distribution at the light valve, using a parabolic collector with a central lamp mounting hole, with a dual cell prismatic light beam homogenizer, according to embodiments of the present invention.

The light path from the parabolic reflective collimator 16 with a central vertex hole 14, using the dual cell beam homogenizer 70, is shown in concept in FIG. 11. The intensity distribution or illumination pattern 92 of the exiting beam of light rays 88 illuminate the light valve 36 as shown in FIG. 12.

It is of note that collimation angle deviations produced by light sources of extended size are preserved for any individual ray passing through the beam homogenizer in each instance, whether the prismatic light beam homogenizer cell 50 or the dual cell beam homogenizer 70 is employed. However, the slope of the exiting rays are reversed for the single cell homogenizer 50, while for the dual cell beam homogenizer 70, the exiting slopes are preserved.

Figure 13:
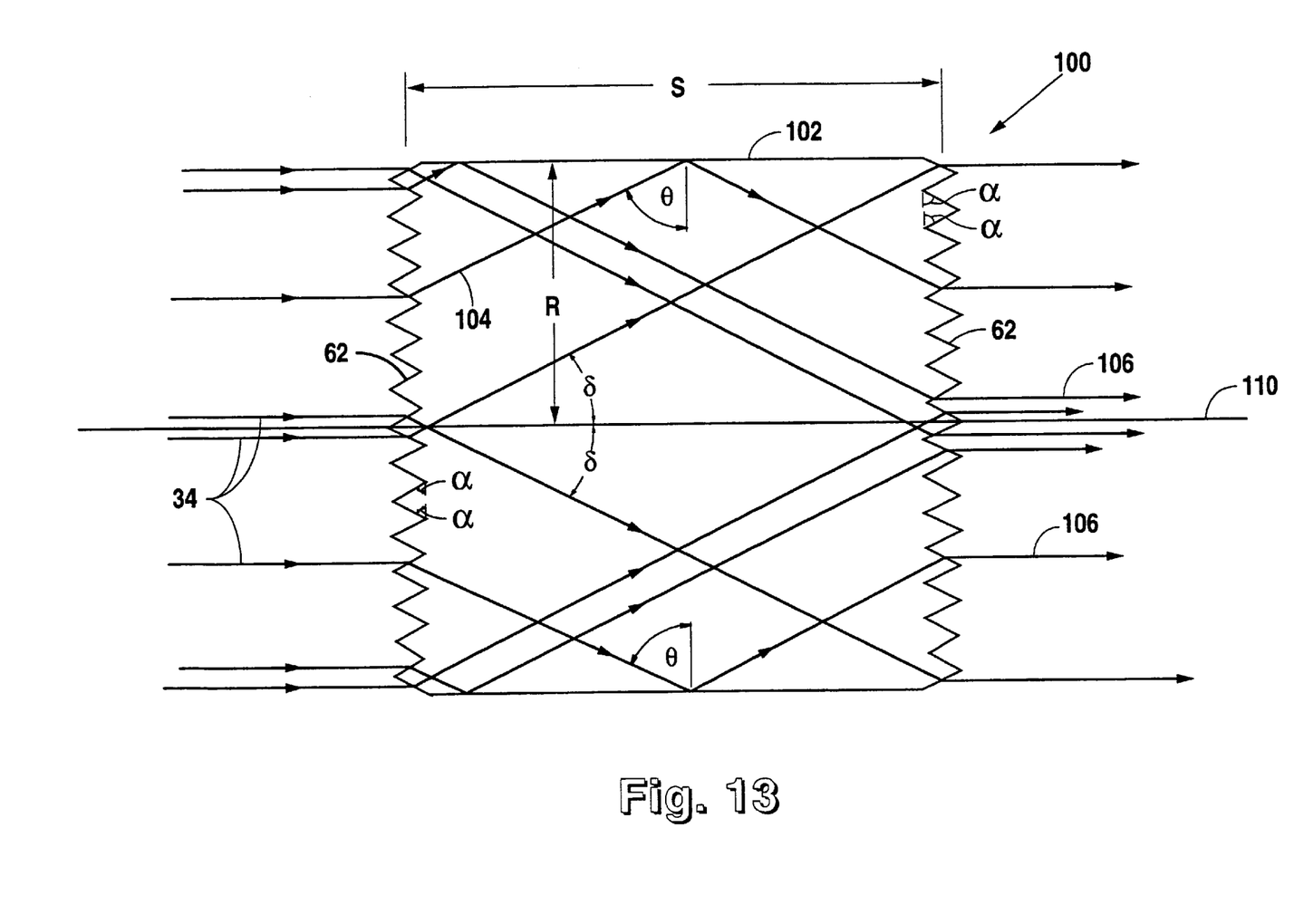
FIG. 13 is an alternative prismatic light beam homogenizer cell, formed of solid refractive material, according to embodiments of the present invention.

Referring to FIG. 13, an embodiment of an alternative prismatic light beam homogenizer cell 100 is a solid cylinder 102 of clear optical material, such as glass or plastic. The solid cylinder 102 has identical series of circular, concentric microprismatic grooves 62 at each planar end. As with the previously described embodiments, the microprismatic grooves 62 consist of series of isosceles triangles with base angles α. Incoming collimated light rays 34 are refracted at the prismatic surfaces of the microprismatic grooves 62 and are deviated within the solid cylinder 102 at a deviation angle δ. In order to minimize blockage of internal refracted rays 104 by adjacent prismatic surfaces, the following relationship must apply:

$$\delta = \pi/2 - \alpha$$

Additionally, for the exiting rays 106 to be refracted in the same direction as the incident rays 34, to maintain the collimation, the following relationship must apply at each surface of the microprismatic grooves 62:

$$\alpha = \arctan(n \sin(\delta)/(n \cos(\delta)-1))$$

where n is the refractive index of the optical material which forms the solid cylinder 102. Internal refracted light rays 104 which are reflected from edges of the solid cylinder 102 generally will have an angle of incidence $\theta=\alpha$, which exceeds the critical angle $\theta_c = \arcsin(1/n)$ for a surrounding air boundary, such that the ray 104 undergoes total internal reflection. Therefore, no additional reflective coating need be applied to the surface of the cylinder 102 of the beam homogenizer cell 100.

By adjustment of the length S of the alternative prismatic beam homogenizer cell 100 of cylindric radius R, incident light rays 34 close to an optic axis 110 exit the beam homogenizer cell 100 as light rays 106 close to the edges or periphery of the solid cylinder 102. Likewise, light rays 34 incident close to the periphery of the beam homogenizer cell 100 exit as light rays 106 close to the optical axis 110. In general, $S=R/\tan(\delta)$. For example, if the beam homogenizer material is acrylic plastic with a refractive index n=1.492, then $\alpha=63.4°$, $\delta=26.6°$, and S=49.9 millimeters for R=25 millimeters. If the beam homogenizer material is optical crown glass with a refractive index n=1.523, then $\alpha=62.9°$, $\delta=27.1°$, and S=48.8 millimeters for R=25 millimeters. Although chromatic dispersion is introduced by the refracting prisms of the microprismatic grooves 62 at an entrance surface thereof, the chromatic dispersion is cancelled out by opposite refraction at the exit surface, since there is no resultant ray deviation. The alternative prismatic light beam homogenizer cell 100, therefore, exhibits no chromatic dispersion.

Figure 14:
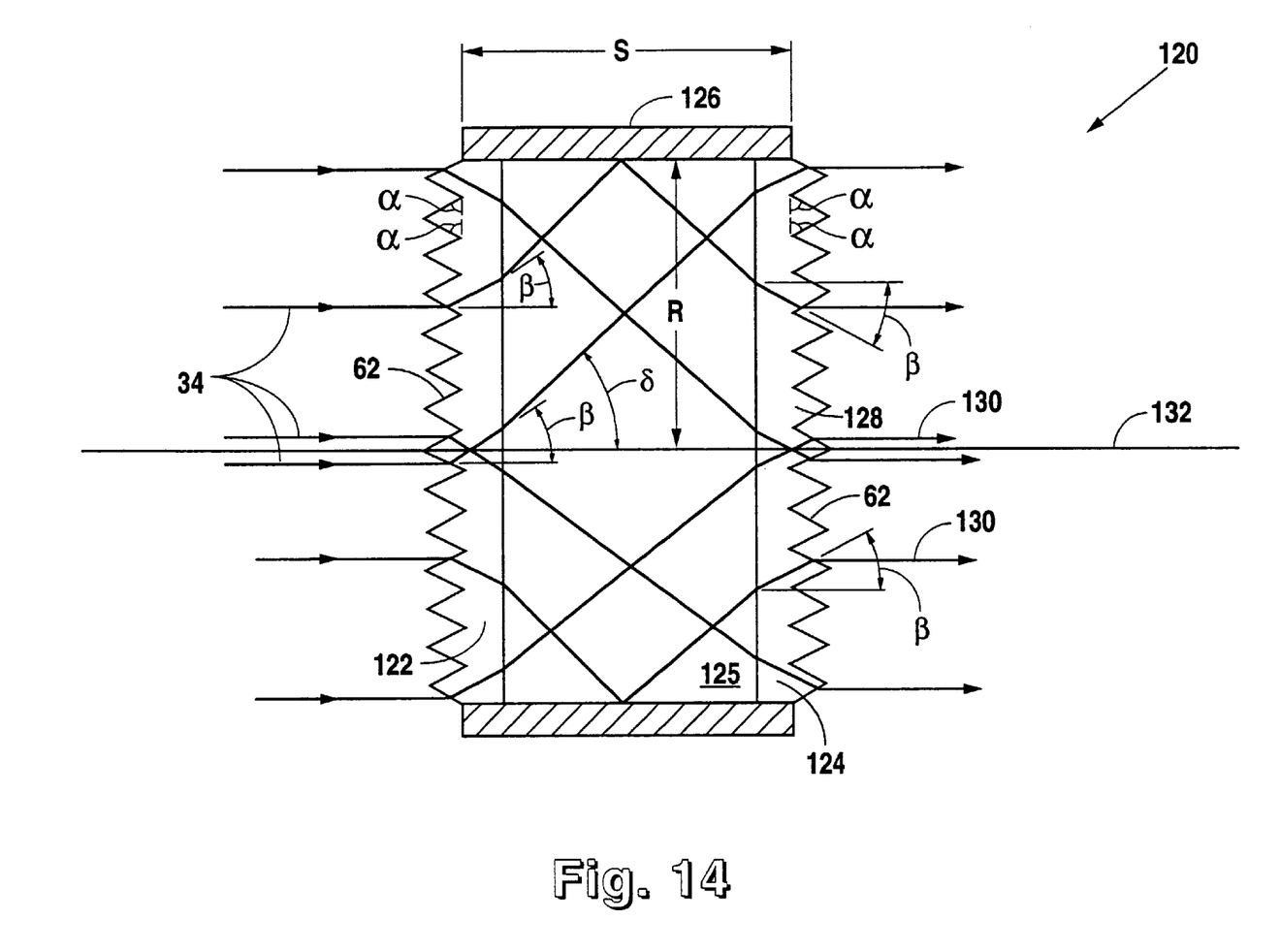
FIG. 14 is another alternative prismatic light beam homogenizer cell, formed of two refractive elements disposed with outwardly directed microprismatic grooves, according to embodiments of the present invention.

Referring to FIG. 14, an embodiment of a second alternative prismatic light beam homogenizer cell 120 includes an input refracting prismatic element 122 and an output refracting prismatic element 124. The elements 122 and 124 are separated by an air space 125 surrounded by a cylinder 126. A reflective coating covers an inner surface 126a of the cylinder 126. Microprismatic grooves 62 are formed on external surfaces of the elements 122 and 124. Plano surfaces 128 are defined as bases of isosceles triangles of the microprismatic grooves 62. Incident collimated light rays 34 are refracted at surfaces of the microprismatic grooves 62 and further refracted at the plano surfaces 128. The isosceles triangles of the microprismatic grooves 62 have base angles $\alpha$. Incoming collimated light rays 34 are refracted at the prismatic surfaces of the grooves 62 and deviated within the input refracting prismatic element 122 at a deviation angle $\beta$. In order to minimize blockage of internal refracted rays by adjacent prismatic surfaces, the following relationship must apply:

$$\beta = \pi/2 - \alpha$$

The deviation angle $\delta$ within the airspace 125 is determined by an additional refraction at the plano surface 128, and is given by:

$$\delta = \arcsin(n \sin(\beta))$$

Additionally, for exiting rays 130 to be refracted in the same direction as the incident rays 34, i.e., to maintain the collimation, the following relationship must apply with respect to each element 122 and 124:

$$\alpha = \arctan(n \sin(\beta)/(n \cos(\beta)-1))$$

where n is the refractive index of the optical material forming the elements 122 and 124.

By adjustment of the length S of the second alternative prismatic light beam homogenizer cell 120 of cylindric radius R, incident light rays 34 close to an optic axis 132 exit the beam homogenizer cell 120 as parallel light rays 130 close to the periphery of the output prismatic element 124. Likewise, incident light rays 34 close to the periphery of the input prismatic element 122 exit the output prismatic element 124 as light rays 130 close to the optical axis 132. In general, $S=R/\tan(\delta)$. For example, if the prismatic elements 122 and 124 are acrylic plastic with a refractive index n=1.492, then $\alpha=63.4°$, $\delta=41.9°$, and S =27.8 millimeters for R=25 millimeters. If the prismatic elements 122 and 124 are optical crown glass with a refractive index n=1.523, then $\alpha=62.9°$, $\delta=43.9°$, and S=26.0 millimeters for R=25 millimeters. Although chromatic dispersion is introduced by the refracting prisms of the microprismatic grooves 62 of the input prismatic element 122, the chromatic dispersion is cancelled by opposite refraction at the input prismatic element 124. The second alternative prismatic beam homogenizer cell 120, therefore, exhibits no chromatic dispersion.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A device for homogenizing light rays from a light source, comprising:
    a first multi-prismatic surface;
    a second multi-prismatic surface; and
    a reflective housing connecting the first multi-prismatic surface with the second multi-prismatic surface.

2. The device of claim 1, wherein the first multi-prismatic surface comprises a generally transparent disk having a smooth surface and a multi-prismatic grooved surface.

3. The device of claim 2, wherein the multi-prismatic grooved surface is multiple concentric prismatic grooves.

4. The device of claim 3, wherein the multiple concentric prismatic grooves are each shaped in cross-section as isosceles triangles having an apex angle of 60°.

5. The device of claim 4, wherein the second multi-prismatic surface is identical to the first multi-prismatic surface and the second multi-prismatic surface is parallel to and oriented towards the first multi-prismatic surface.

6. The device of claim 1, wherein the light rays from the light source are radially inverted as the light rays pass through the first multi-prismatic surface and the second multi-prismatic surface, within the reflective housing.

7. The device of claim 1, wherein the reflective housing is cylindrical and internally reflective and separates the first multi-prismatic surface and the second multi-prismatic surface by R tan $\delta$, wherein the first and second multi-prismatic surfaces each have radius R and deviation angle of the light rays $\delta$.

8. A device for homogenizing light rays from a light source, comprising:
    an input multi-prismatic surface;
    a common multi-prismatic surface;
    an output multi-prismatic surface; and
    a reflective housing connecting the input multi-prismatic surface, the common multi-prismatic surface, and the output multi-prismatic surface.

9. The device of claim 8, wherein the common multi-prismatic surface comprises a generally transparent disk having a first multi-prismatic grooved surface and a second multi-prismatic grooved surface in opposing, parallel relationship.

10. The device of claim 9, wherein the input multi-prismatic surface and the output multi-prismatic surface each have a smooth surface and a multi-prismatic grooved surface, and the smooth surfaces of the input multi-prismatic surface and the output multi-prismatic surface, respectively, are parallel to and oriented toward the first multi-prismatic grooved surface and the second multi-prismatic grooved surface, respectively.

11. The device of claim 8, wherein the reflective housing comprises a first internally reflective cylinder connecting the input multi-prismatic surface and the common multi-prismatic surface and a second internally reflective cylinder connecting the common multi-prismatic surface and the output multi-prismatic surface.

12. The device of claim 11, wherein each of the multi-prismatic grooved surfaces is concentric grooves each shaped in cross-section as isosceles triangles having an apex angle of 60°.

13. The device of claim 8, wherein the light rays from the light source are radially inverted as the light rays pass through the input multi-prismatic surface and the second multi-prismatic surface, within the reflective housing, and are again radially inverted to obtain the light rays as originally oriented, but with greater homogeneity and no dark spot.

14. The device of claim 11, wherein the first internally reflective cylinder separates the input multi-prismatic surface and the common multi-prismatic surface by $R_1 \tan \delta_1$, wherein the input and the common multi-prismatic surfaces each have radius $R_1$ and deviation angle of the light rays $\delta_1$, and the second internally reflective cylinder separates the output multi-prismatic surface and the common multi-prismatic surface by $R_2 \tan \delta_2$, wherein the input and the common multi-prismatic surfaces each have radius $R_2$ and deviation angle of the light rays $\delta_2$.

15. A device for homogenizing light rays from a light source, comprising a solid cylinder having a first planar end and a second planar end, the first planar end having concentric prismatic grooves and the second planar end having concentric prismatic grooves.

16. The device of claim 15, wherein the solid cylinder is a generally transparent glass or plastic.

17. The device of claim 15, wherein the concentric prismatic grooves are each, in cross-section, isosceles triangles with base angles $\alpha$ and deviation angle of the light rays is $\delta$, wherein $\delta$ is equal to $\pi/2-\alpha$ and $\alpha$ is equal to arctan $(n \sin (\delta)/(n \cos (\delta)-1))$.

18. The device of claim 17, wherein the solid cylinder has length of $R/\tan(\delta)$, where R is the radius of the solid cylinder.

19. A liquid crystal display projection system, comprising:
 a parabolic reflective collimator;
 a lamp centered in the parabolic reflective collimator, the lamp emitting light rays reflected by the parabolic reflective collimator;
 a first multi-prismatic refractive surface disposed in the light rays reflected by the parabolic reflective refractive collimator;
 a second multi-prismatic surface;
 a reflective housing connecting the first multi-prismatic surface with the second multi-prismatic refractive surface; and
 a liquid crystal display positioned to receive light rays passing through the first multi-prismatic refractive surface, the reflective housing, and the second multi-prismatic refractive surface.

20. The system of claim 19, wherein the reflective housing is cylindrical and internally reflective and separates the first multi-prismatic surface and the second multi-prismatic surface by $R \tan \delta$, wherein the first and second multi-prismatic surfaces each have radius R and deviation angle of the light rays $\delta$.

* * * * *